United States Patent [19]

Sconyers

[11] 4,323,005
[45] Apr. 6, 1982

[54] UNIFORM BARBEQUE COOKING OF LARGE MEAT SECTIONS

[76] Inventor: Larry E. Sconyers, 2115 Windsor Spring Rd., Augusta, Ga. 30906

[21] Appl. No.: 94,748

[22] Filed: Nov. 15, 1979

[51] Int. Cl.³ .............................................. A47J 37/04
[52] U.S. Cl. ......................................... 99/400; 99/419
[58] Field of Search .................. 99/400, 419, 421 H, 99/421 V, 446; 126/25, 337, 390

[56] References Cited

U.S. PATENT DOCUMENTS

| 5,239 | 8/1847 | Antognini | 126/2 |
|---|---|---|---|
| 151,508 | 6/1874 | Peckover | 126/2 |
| 2,095,745 | 10/1937 | Hiatt | 126/2 |
| 2,124,837 | 7/1938 | Trilo | 126/2 UX |
| 2,441,190 | 5/1948 | Fuller | 126/25 R |
| 2,998,814 | 9/1961 | Forsberg | 126/2 X |
| 3,098,428 | 7/1963 | Maxwell | 99/446 |
| 3,121,386 | 2/1964 | Persinger et al. | 99/446 X |
| 3,344,737 | 10/1967 | Sanders | 99/446 |
| 3,491,679 | 1/1970 | Kelly | 99/446 X |
| 3,756,140 | 9/1973 | Kolivas | 99/446 X |
| 3,757,671 | 9/1973 | Warshauer et al. | 99/446 X |
| 3,757,675 | 9/1973 | Wilbricht | 99/446 |
| 4,162,650 | 7/1979 | Davis et al. | 99/419 |

Primary Examiner—Harvey C. Hornsby
Assistant Examiner—A. Henderson
Attorney, Agent, or Firm—Shanley, O'Neil and Baker

[57] ABSTRACT

Barbeque structure free of internal compartmentation which would block free movement of heated gases and passage of radiant heat is disclosed. Vertically oriented walls define an open pit with firebox heat source and rendering collection surface arranged in a predetermined manner contiguous to floor level. A removable, open framework provides stable support for meat sections at a working level above the heat source without obstructing heat passage. An open-space rack supports elongated meat sections, such as whole hams, with elongated dimension vertically oriented above the rendering collection surface. A movable cover means is positioned to span the vertical walls at their upper ends to close the pit and confine heat. The dome-like configuration cover means extends above and about the meat sections being barbequed presenting a solid surface which redirects heat toward the meat sections. The substantially unobstructed passage of heat from the fireboxes and the confinement and redirection of heat by the cover means causes heat to penetrate meat sections being barbequed from all directions.

13 Claims, 4 Drawing Figures

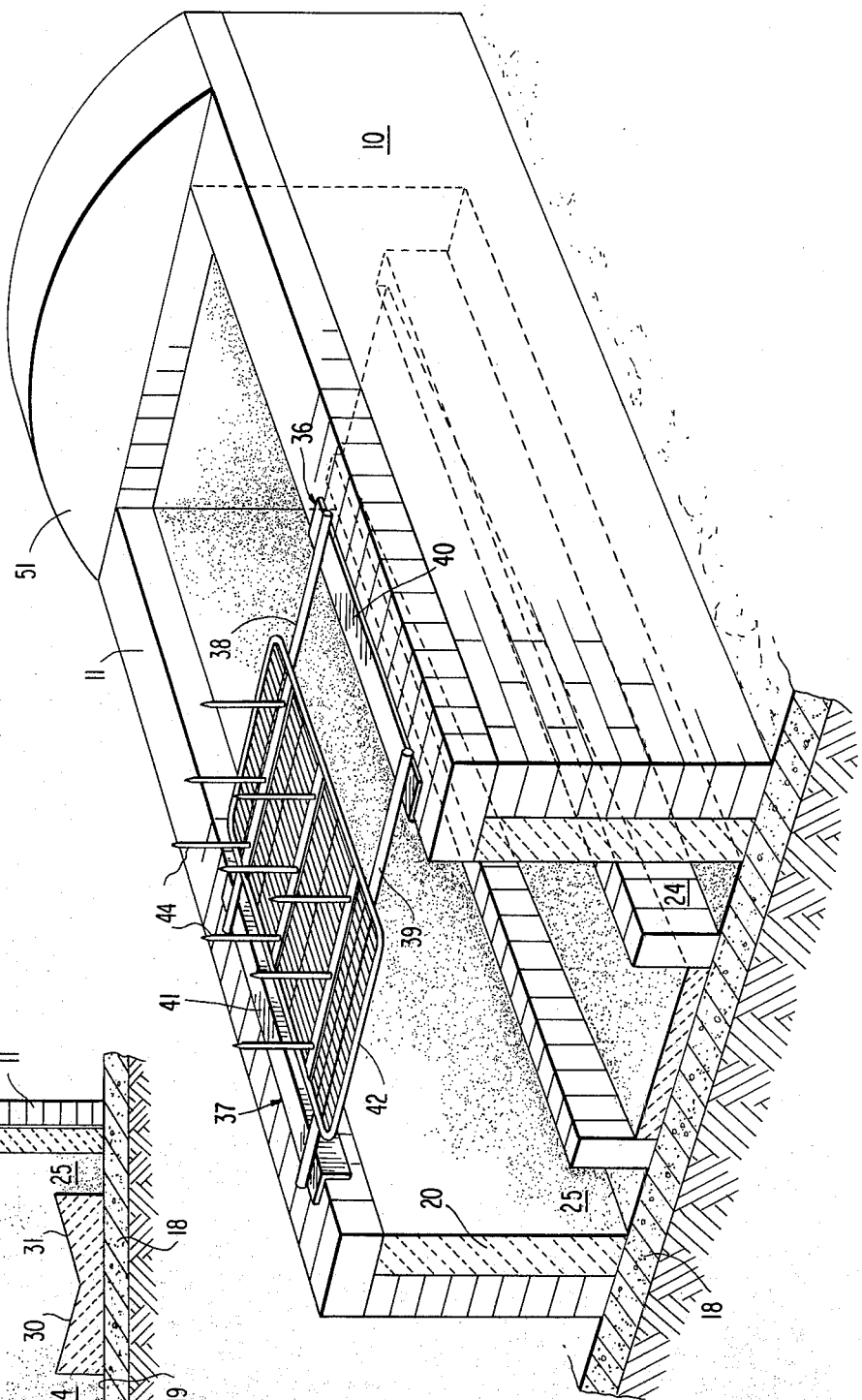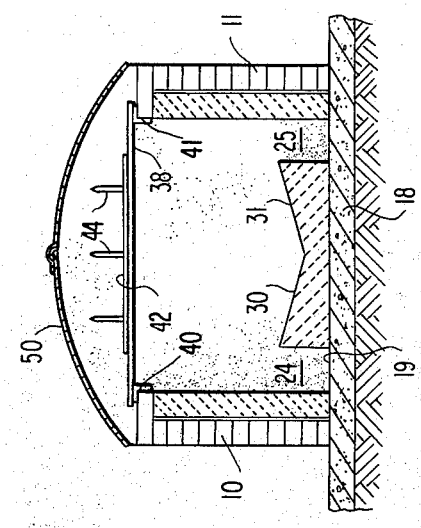

UNIFORM BARBEQUE COOKING OF LARGE MEAT SECTIONS

This invention is concerned with improved efficiency barbequeing and more particularly with providing for uniformity in barbeque cooking of large meat sections such as whole hams during extended cooking cycle times while eliminating any requirement for turning or other handling of the meat during such cooking periods.

In the past, barbequeing structures have utilized compartmentation along the vertical direction or other arrangements which resulted in a tortuous flow path for heated gases coming from a heat source located at the bottom of the structure. Also, heat transfer was often further obstructed by rendering collection structures in the cooking area which totally blocked or blocked a major portion of the radiant heat. Such complex structures resulted in reduced efficiency because of obstruction of radiant heat paths. Also, the heated gases usually entered from one side of a cooking compartment and flowed in one direction through such compartment exposing one side of the meat sections to be cooked to higher temperature gases. In brief, not only were such structures complex and expensive to manufacture and to operate but, uniformity of cooking left much to be desired; further, they required special attention, with periodic turning of the meat being cooked, which resulted in additional heat losses and inefficiency.

The structure and operation provided by the present invention eliminates such inefficiencies of the prior art. The vertical compartmentation of the prior art to establish particular flow paths for heated gases is eliminated resulting in more efficient use of heat energy and more uniform cooking, free of attendant care over an extended cooking cycle. The invention also provides for collection of renderings uncontaminated by or with the source of heat without diminishing efficiency or uniformity of cooking. With the present invention, large meat sections, such as whole hams, are heated to render as much fat as possible while avoiding drying the meat; the generated heat is held in contact with the meat sections and caused to penetrate the meat sections from all directions.

Other advantages and contributions of the invention will be brought out in a more detailed disclosure of the invention by describing embodiments shown in the accompanying drawings. In these drawings:

FIG. 1 is a lateral cross-sectional view of a specific embodiment of the invention with cover means in place;

FIG. 4 is a perspective view with an end wall cut away showing another internal configuration of the invention with rack support means in place.

Figure 2:
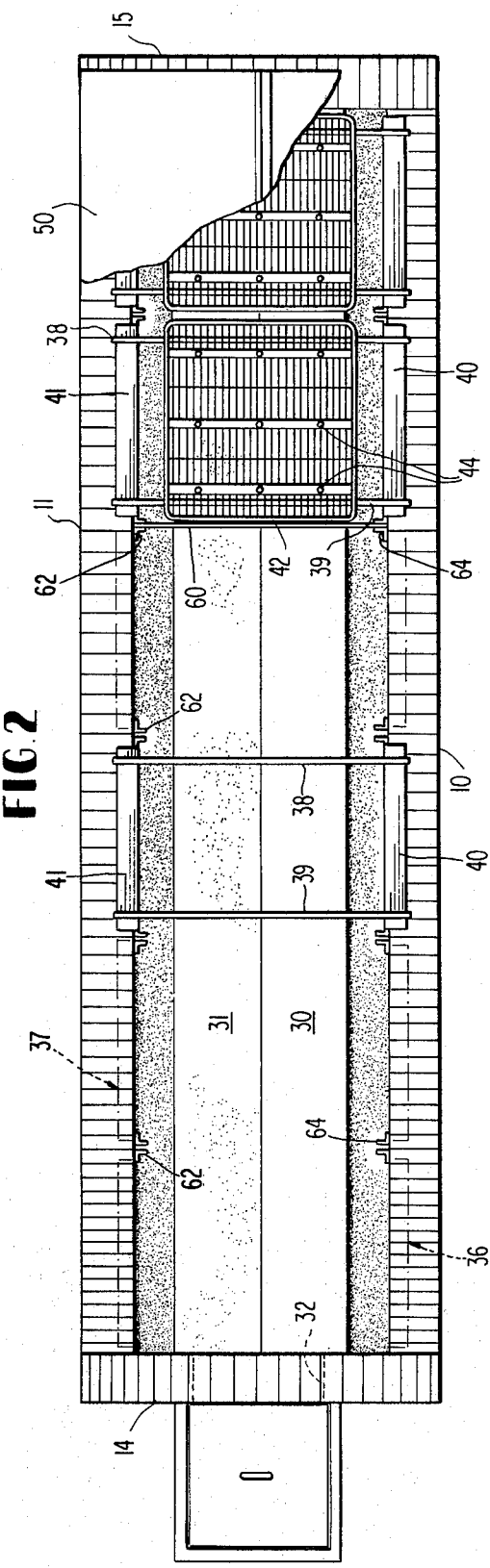
FIG. 2 is a horizontal cross-sectional view of an elongated embodiment of FIG. 1 with a major portion of the cover means cut away and showing rack structure and means for using less than full capacity.

An important contribution of the invention is provision of an open pit structure which is substantially unobstructed to provide for free movement of radiant heat and heated gases. In the rectangular configuration shown, longitudinally extending side walls 10 and 11 and laterally extending end walls 14 and 15 extend vertically upwardly from support flooring 18.

Interior bottom wall 19 of the pit structure is subdivided horizontally to provide for heating and for collecting renderings; firebox means and rendering collecting surfaces for these purposes are dimensionally extended horizontally within the pit structure along bottom wall 19. As best seen in the rectangular configuration embodiment of FIGS. 1, 2, and 4, wherein the same reference numerals are used to designate structures having the same function, fireboxes 24 and 25 extend along substantially a full dimension of the pit structure and are positioned contiguous to side walls 10 and 11.

Figure 3:
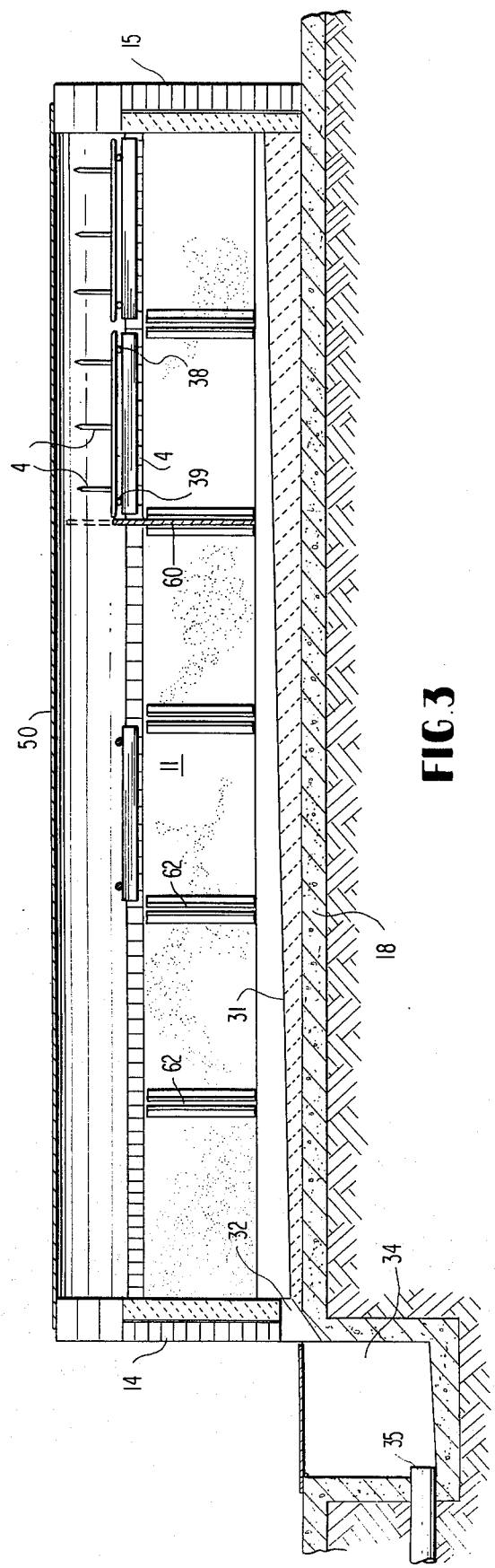
FIG. 3 is a longitudinal cross-sectional view of the embodiment of FIG. 3 without the cover means.

Rendering collecting surfaces 30, 31, as best seen in FIG. 1, are angled downwardly toward a center line of the pit structure; further, as best seen in FIG. 3, these surfaces extend over substantially the full dimension from lateral end wall 15 to the remaining lateral end wall 14 and, are sloped from a higher level at wall 15 to a lower level at wall 14. Such means for collecting renderings communicate with the exterior of the pit structure through drain 32 which extends to grease trap 34; the latter is drained by pipe 35 leading to a holding tank (not shown). The fireboxes and rendering collection surfaces are either formed from fire brick, fire brick lined, or present suitable refractory surfaces for exposure to heat.

In accordance with the invention, the pit structure bottom wall is arranged to coact with support means for large meat sections to be cooked so as to provide for uncontaminated collection of renderings as well as for free passage of heated gases and substantially unobstructed radiant heat paths. The support structure should serve such functions as well as provide for reliable and safe support of large meat sections during placement, cooking and removal; in addition, the support structure should be readily removable to provide full access to the interior of the pit structure for cleaning fireboxes and the like.

In a preferred embodiment, a framework structure is firmly supported on the sidewalls to avoid movement during usage. As shown in FIGS. 2, 3 and 4, the framework structure includes angle irons designated generally as 36 and 37 extending along the upper interior corner of sidewalls 10 and 11 respectively. As shown, the longitudinally extending angle irons are subdivided into single rack sections along their length and joined by rack support rods. For example, lateral support rods, such as 38 and 39, extend between angle iron sections 40, 41 to provide beam support for a rack such as 42. Angle iron sections can be placed along the longitudinal length to provide balanced support for a plurality of individual racks, such as 42. A central, longitudinally-extending bar (not shown) can be used to join rods such as 38 and 39 at their mid-point to provide additional safety in avoiding dropping of racks such as 42 during placement, removal, or movement of the racks on the support structure.

This framework support structure is held rigidly on the sidewalls precluding movement during handling of racks such as 42 at that level of the pit. The angle irons provide secure contact with the sidewalls when placed as shown or, ledges can be provided along the interior corner of the sidewalls for inset placement of angle irons or bars. The lateral rods are secured to the angle irons by welding or otherwise. While angle irons can extend along the full length of the pit structure, subdividing longitudinally into sections as shown provides greater ease in removal for cleaning or other purposes.

Rack 42 includes upright prongs such as 44 predeterminedly distributed horizontally of the rack. These upright prongs provide for support of elongated sections of meat to be barbequed, such as whole hams, with the elongated dimension of such hams oriented vertically. Rack 42 provides for convenient placement or removal of a number of hams at the same time; typically, rack 42 holds nine (9) hams of approximately twenty to twenty-five pounds each.

The upright support prongs, such as 44, are located vertically above the rendering collection means so as to deposit renderings only on such surfaces as 30, 31. The size of the rack can match that of the collection surface or surfaces; and/or, placement of the upright prongs can be such that the areas vertically above the firebox structures 24, 25 are free of such upright prongs. The rack structure utilizes open mesh wire to avoid obstruction of heat.

Another important feature of the open structure support means is the coaction with a removable cover which retains and redirects heat to cause heat to penetrate the supported meat sections from all directions including from above the meat sections being cooked. The heated gases are held in contact with the hams or similar meat sections to be cooked and, along with radiant heat redirected by the cover means, provide for uniform cooking and rendering of fat without drying out of the meat.

As shown in FIG. 1, a sheet metal cover 50 spans the open pit structure from side wall 10 to side wall 11. Sheet metal cover 50 arches upwardly above and about meat sections supported on rack 42; the configuration of sheet metal cover 50 is predetermined to allow for the size of the meat sections to be barbequed and for redirection of heat energy. A dome-like configuration for the sheet metal cover 50 provides for redirection of the heat downwardly.

The sheet metal cover spans the open pit between the longitudinal side walls and lateral walls. Lateral end walls 14, 15 can have an arch-shaped configuration, such as 51 for end wall 15 in FIG. 4, at their upper peripheries to simplify the curvilinear configuration of cover 50, and cover 50 can then be more readily subdivided into cover sections. However, a compound curvilinear configuration cover can be provided which contacts horizontal planar surfaces on each peripheral wall. The cover 50 is supported by the vertically oriented walls and confines the heated gases. Radiant heat and heated gases are redirected toward the support rack 40 and pit by the cover configuration.

Preferably, a sheet metal such as aluminum is utilized for cover 50. Also, preferably, the sheet metal is embossed or corrugated to provide an interior surface which helps scatter radiant heat and heated gases more effectively toward the rack supported meat sections and facilitate the penetration of heat from all directions.

With the structure shown, after large meat sections such as whole hams are placed with their elongated dimension in the vertically upright position on prongs such as 44, the rack 42 is positioned with meat support prongs vertically above collecting surfaces 30, 31. With heat provided and the cover 50 in place, no rotating or turning of the hams is necessary because of the uniformity of penetration of the heat from all directions into such hams. Therefore, the hams can be left virtually unattended for the entire cooking cycle, e.g. up to about 12 hours. The sheet metal cover can remain in place during the cooking cycle. When charcoal or other similar sources of heat are provided in the fireboxes, the sheet metal cover 50, or a cover section, can be removed after approximately a six-hour interval for stirring of the coals. However, the confinement of heat and heated gases during cooking conserves fuel and conventional charcoal briquettes will extend through an entire cooking cycle for large sections of meat such as whole hams.

For example, utilizing a rectangular configuration for the invention as shown in the drawings, nine whole hams of approximately twenty-five pounds per ham, can be accommodated on a rack 40 of approximately twenty-eight inches length and twenty-two inches width. Prongs such as 44 of about ten inches in length extend vertically above the rack 42 with the prongs being spaced approximately seven inches in the lateral dimension and approximately ten inches in the longitudinal dimension. The vertically oriented walls of the pit structure are approximately thirty inches high. The rendering collection surface should extend over approximately the full internal length of the pit structure; that is, approximately thirty-five inches of a rectangular embodiment accommodating a single rack for supporting nine hams.

In a single rack embodiment, the fireboxes can extend about thirty inches along each side wall a distance approximately equal to the length of a rack and, are about eight inches in width and five to six inches in height. Vertical spacing between the top of coals in the firebox and the rack is about twenty inches.

An important contribution of the invention is the fuel economy provided at least in part by the lack of interior obstructions. In a single rack embodiment, each firebox is filled with conventional charcoal briquettes of the type commonly used in outdoor grills. One filling of the fireboxes, i.e. slightly less than two cubic feet of charcoal briquettes, is adequate to cook nine hams having an average weight of twenty to twenty-five pounds per ham; cooking time is approximately twelve hours. Uniform cooking is provided throughout with maximum removal of fat while avoiding drying out of the meat. Other than start-up and removal procedures, requirements for an attendant for the meat are substantially eliminated during barbequeing; the hams need not be turned or handled in any way during the cooking process.

The pit side walls can be extended longitudinally, as shown in FIGS. 2 and 3, to accommodate a plurality of ham support racks such as 42. Another advantageous aspect of the invention contributing to fuel efficiency while facilitating adaptability to changing quantity demands for barbequed hams is available with the elongated embodiment with the means shown in FIGS. 2 and 3. When demand is low, one or two racks of hams can be barbequed at a time utilizing only a limited portion of the overall length of the structure while avoiding substantial heating of or heat losses from the full length. A vertically oriented divider such as 60 can be placed to divide the structure along its length into individual barbequeing compartments or chambers while maintaining the substantially unobstructed vertical passage of heat and heated gases within such individual compartment as described earlier. In effect, divider 60 serves the function of an endwall for the subdivided structure.

Sidewall slots, as indicated by 62, 64, for holding divider 60 can be provided along the length of the structure at distances approximating the length of an individual rack such as 42. Such sidewall support for divider 60 can be slots formed in the sidewalls or slots formed by angle irons attached to the sidewalls. Cover 50 can be similarly subdivided into individual sections which extend down to a divider wall, or the divider 60 can be extended above the rack support level to close off the profile of the cover portion to the selected length of the pit structure to be used.

Charcoal requirements based on the number of loaded racks to be barbequed are added to fireboxes in the section which has been separated from the remainder. Divider 60 is contoured at its lower portion to allow passage of renderings along rendering collecting surface means at the bottom of the pit yet substantially block escape of heat or heated gases above such rendering passage level. With such teachings, the advantages and economies of the invention are available for quantities less than the full capacity of a structure.

Fire brick, a kaolin base concrete, or other suitable fire lining materials, well known in the refractory art, are used for the fireboxes and interior floor and wall surfaces of the pit structure while external wall surfaces can utilize more conventional masonry construction material.

Cover 50 can be supported by the walls so as to be completely removable or, can be interconnected with a wall structure. As an example of the latter, cover 50 can be hinged along a surface of a wall to permit an upward swinging movement for access. Cover 50 can be subdivided along its length to provide access to single or multiple racks.

The teachings of the invention can be adapted to other configurations. Also, other arrangements of or dimensions for the fireboxes and the collecting surfaces can be utilized within the teachings provided. And, modifications of the open-space meat support structures or cover configurations can be made in the light of the above teachings without departing from the invention. Therefore, for purposes of determining the scope of the present invention, reference should be made to the appended claims.

I claim:

1. Structure for providing uniformity in barbeque cooking of large sections of meat such as whole hams supported so as to be free of turning or attendant requirements over an extended cooking cycle and to provide for collection of renderings free of contamination of or by a source of heat, comprising
   a pit structure with vertically oriented wall means extending upwardly from a pit floor defining an open pit free of flow obstructing compartmentation in the vertical direction,
   such pit structure being generally rectangular in horizontal cross-section and having elongated side walls,
   firebox heat source means located contiguous to pit floor level,
   rendering collection surface means contiguous to pit floor level, such surface being dimensionally extended horizontally to provide for run-off of renderings from meat sections being barbequed,
   such firebox heat source means comprising a narrow-width elongated firebox located contiguous to each such side wall with the rendering collective surface means being located intermediate fireboxes,
   drain means communicating with such rendering collection surface means and including passage means for fluids extending between the interior and exterior of the pit structure,
   rack means including vertically oriented meat support prongs, the latter being predeterminedly spaced and distributed horizontally,
   such rack means presenting an open structure to facilitate vertical movement of heated gases and passage of radiant heat within the pit structure,
   rack support means for supporting the rack means within such open pit at a level above such heat source means, such rack support means providing for substantially unobstructed passage of heated gases and radiant heat within the pit structure,
   such predeterminedly spaced distribution of meat support prongs locating such prongs for vertically oriented support of meat sections within an area defined by a vertical projection of the rendering collection surface means so as to deposit renderings on such rendering collection surface means, and
   pit cover means having a configuration extending over and above meat sections supported on such upright prongs,
   such cover means spanning the vertically oriented wall means of the pit structure to confine heat within such open pit and substantially limit escape of heated gases during cooking,
   such cover means being movable to provide access to supported meat sections.

2. The structure of claim 1 in which such firebox means are dimensionally extended in the horizontal plane to be substantially coextensive with at least one dimension of the pit structure.

3. The structure of claim 1 in which
   such rendering collection surface means and fireboxes are substantially coextensive dimensionally with such side walls.

4. The structure of claim 3, in which such collection surface means is sloped downwardly from one longitudinal end of the pit structure toward the remaining longitudinal end to cause movement of collected renderings toward such remaining longitudinal end.

5. The structure of claim 3 in which the rack support means include means spanning such open pit to provide beam support between side walls of the pit structure and
   the upright meat support prongs are located to be intermediate a vertical projection of such fireboxes.

6. The structure of claim 3 in which the pit structure is elongated to accommodate a plurality of rack means.

7. The structure of claim 6 further including
   means for longitudinally subdividing the elongated pit structure into compartments.

8. The structure of claim 7 in which such cover means is longitudinally subdivided to provide individual access to compartments established by the means for longitudinally subdividing the elongated pit structure.

9. The structure of claim 6 in which the elongated pit structure includes means for receiving a divider wall to longitudinally subdivide the elongated pit structure.

10. The structure of claim 3 in which the rack support means includes framework members subdivided into sections to accommodate an individual rack means, with a plurality of such framework sections extending in contiguous relationship over substantially the full longitudinal dimension of the pit structure.

11. The structure of claim 1 or 10 in which the rack support means are removable to provide open access to the fireboxes and other interior portions of the pit structure.

12. The structure of claim 1 in which such cover means comprises sheet metal having a dome-like configuration to redirect heat and heated gases downwardly into such pit structure.

13. The structure of claim 12 in which such sheet metal of the cover means presents an irregular internal surface to facilitate scattering of radiant heat and heated gases.

* * * * *